United States Patent
Wan et al.

[11] Patent Number: 5,965,813
[45] Date of Patent: Oct. 12, 1999

[54] INTEGRATED FLOW SENSOR

[75] Inventors: Yue-Min Wan; Ching-Yi Wu, both of Hsinchu, Taiwan

[73] Assignee: Industry Technology Research Institute, Hsinchu, Taiwan

[21] Appl. No.: 09/120,725

[22] Filed: Jul. 23, 1998

[51] Int. Cl.$^6$ .................................................. G01F 1/68
[52] U.S. Cl. ................................. 73/204.26; 73/204.15
[58] Field of Search ........................... 73/204.05, 204.11, 73/204.15, 204.19, 204.26

[56] References Cited

U.S. PATENT DOCUMENTS

| | | | |
|---|---|---|---|
| 4,326,412 | 4/1982 | Kobayashi et al. | 73/204 |
| 5,024,083 | 6/1991 | Inada et al. | 73/204.26 |
| 5,186,051 | 2/1993 | Stecher et al. | 73/204 |
| 5,353,638 | 10/1994 | Marek | 73/204.26 |
| 5,392,646 | 2/1995 | Yajima | 73/204.19 |
| 5,423,210 | 6/1995 | Uchiyama | 73/204.15 |
| 5,423,212 | 6/1995 | Manaka | 73/204 |
| 5,623,097 | 4/1997 | Horiguchi et al. | 73/204 |

*Primary Examiner*—Harshad Patel
*Assistant Examiner*—Robin C. Clark
*Attorney, Agent, or Firm*—Bacon & Thomas, PLLC

[57] ABSTRACT

A flow sensor comprises a heater module, a fluid temperature sensor and a Wheatstone bridge module. In the heater module, a heater is disposed very close to a heater temperature sensor and an insulation layer electrically isolates these two elements. The heater and the heater temperature sensor are disposed together on a floating membrane positioned normally to the fluid flow. The Wheatstone bridge module regulates electric current supplied to the heater, based on a constant temperature difference between the heater and the fluid, and provides voltage information of the electric current. A microprocessor converts the voltage information into velocity of fluid to be measured. A bypass channel is designed to adjust flow impedance of the fluid. Further disclosed is a fluid temperature sensor with the same design of the heater module whereby the factor of flow direction of the fluid may be ignored.

9 Claims, 3 Drawing Sheets

INTEGRATED FLOW SENSOR

FIELD OF INVENTION

The present invention relates to an integrated flow sensor, especially to an integrated thermal flow sensor.

BACKGROUND OF THE INVENTION

A thermal flow sensor measures fluid velocity of, such as, gas and liquid utilizing the principle of balancing input and output energy. In a balanced system of a thermal flow sensor, the input is simply thermal energy converted into electric format and the output thermal energy includes thermal conductivity, thermal radiation and convective heat losses. Among them, the convection heat loss is the dominating term. When the input energy and the output energy are balanced, the convective heat-loss is used to measure the velocity of the fluid.

FIG. 1 illustrates the system diagram of a conventional thermal flow sensor. As shown in the figure, a thermal flow sensor comprises: a fluid channel 1 (see FIG. 3) through which fluid F flows, a fluid temperature sensor 6 to sense the temperature of the fluid F, a heater 72 to supply thermal energy to the fluid F, a DC power supply 9 to supply electric current to heater 72, a heater temperature sensor 74 to sense the temperature of the heater 72, a Wheatstone bridge module 10 to regulate the DC current supplied to the heater 72 and a microprocessor 11 to measure changes in the voltage of the current supplied to the heater 72 and to convert said change into velocity values of the fluid F.

In order to shorten the response time, a thermal flow sensor operates under a "constant temperature difference mode". Under such mode, heater 72 is positioned inside the fluid channel 1 (see FIG. 3), and a constant temperature difference between heater 72 and the fluid F is maintained, such that the temperature of the heater 72 is always higher than that of the fluid F. In doing this, temperature information obtained from the fluid temperature sensor 6 and the heater temperature sensor 72 may be taken for reference. In order to transfer thermal energy from the heater 72 to the fluid F, heater 72 is always in direct contact to the fluid F. When the fluid flows, due to the temperature difference between the heater and the fluid, thermal energy contained in the heater is carried away by the fluid. The thermal energy carried away by the fluid is in direct proportion to the square root of velocity of the fluid. To maintain a constant temperature difference, a feedback control loop is used to regulate electrical current supplied to heater 72. When the constant temperature difference is maintained, the thermal energy (electric currency) needed to retrieve the temperature of the heater 72 may be measured and the fluid velocity may be known.

In the conventional art, the said feedback control loop may be a Wheatstone bridge module. FIG. 2 illustrates the circuit diagram of a Wheatstone bridge module for a thermal flow sensor. As shown in the figure, a Wheatstone bridge module 10 has a Wheatstone bridge 21, an operational amplifier 22 and a heater $R_H$. At one branch of the Wheatstone bridge there are fluid temperature sensor $R_f$ and resisters $R_1$ and $R_2$, while at the other branch are heater temperature sensor $R_5$ and resistor $R_3$. Temperature sensor $R_f$ and resisters $R_1$ and $R_2$ provide a reference voltage $V_1$ to the operation amplifier 22 and heater temperature sensor $R_5$ and resistor $R_3$ Provide another reference $V_1$ to the operation amplifier 22. By setting up a minute voltage difference between $V_1$ and $V_2$, i.e., with the assistance of resistor $R_1$, the circuit will come to a steady state by heating up resistor $R_H$ (the heater temperature sensor 74) and resistor $R_5$ (fluid temperature sensor).

In order to improve the overall performance of a thermal flow sensor system, it is necessary to enhance the ratio of the heat convection loss, in contrast to the radiational and conductive losses of the thermal energy, during the flow of the fluid. Over the past years various improvements for the thermal flow sensor have been invented. Among these improvements, some used silicon micro-machining technology to minimize the size of the heater 72 or to isolate the heater 72 from the rest parts of the flow sensor, so to minimize unwanted losses of thermal energy during the flow of the fluid. Some proposed to position the heater temperature sensor 74 as close as possible to the heater 72 by using concrete elements such as multi-layer, thin film resistors positioned on a microbridge or on a micro membrane.

Other developments to the performance of the thermal flow sensor include: U.S. Pat. No. 4,326,412, to Hiroshi et al. (1982), U.S. Pat. No. 5,186,051, to Stecher et al. (1996) and U.S. Pat. No. 5,623,097, to Horiguchi et al. The Hiroshi invention disclosed a thermal flow sensor used in fuel control system for auto combustion engine. In the Hiroshi invention, a network of metal wire segments in two cross sectional planes in a fluid pipe is used to measure a non-uniform flow of gasoline in an average manner. In the flow, adjacent to the boundary the dragging effect slows down the velocity of the gasoline. In the Stecher invention, disclosed are a thin film heater and a heater temperature sensor coupled very close to each other in order to provide precise measurement of the heater temperature. In the Horiguchi invention disclosed is a heater with a sensor stacked to it and positioned on a microbridge. These and other improvements, however, have a common problem. That is, the heater and temperature sensor are positioned in parallel to the fluid flow. This arrangement creates a thermal boundary layer on the surface of the heater-temperature assembly. The thermal boundary layer impedes the heat convection efficiency from the heater to the fluid. Other problems include that the components used in these disclosures are not compact enough and make the device bulky.

In the conventional art, the fluid temperature sensor 6 is positioned in the up-stream direction of the flow and the heater 72 in the down-stream direction. This creates a problem in installing the flow sensor while the direction of the flow shall be taken for consideration.

It is thus a need in the industry to provide an integrated flow sensor with higher precision. It is also a need to provide a thermal flow sensor where the area of the thermal boundary layer may be minimized. It is also a need to provide a thermal flow sensor that is easy to manufacture under semiconductor manufacture process, so that the heat capacity of the system may be reduced. It is also necessary to provide a thermal flow sensor where the factor of flow direction may be ignored.

OBJECTIVES OF THE INVENTION

The purpose of this invention is to provide an integrated flow sensor with enhanced precision.

Another purpose of this invention is to provide an integrated flow sensor with increased heat transfer coefficient between the heater and the fluid.

Another purpose of this invention is to provide an integrated flow sensor with minimized thermal boundary layer on the surface of the heater-temperature sensor assembly.

Another purpose of the invention is to provide an integrated flow sensor easy to manufacture under semiconductor manufacture process, so to reduce the heat capacity of the system.

Another purpose of the invention is to provide an integrated flow sensor where the factor of flow direction of the fluid to be measured, may be ignored.

SUMMARY OF THE INVENTION

According to the integrated flow sensor of this invention, a flow sensor comprises a bypass channel to conduct fluid flow to be measured with a heater module and a fluid temperature sensor inside it. In the heater module of this invention, a heater is disposed very close to a heater temperature sensor and an insulation layer electrically insulates these two elements. The heater and the heater temperature sensor are disposed together on a floating membrane positioned normally to the fluid flow so to restrict the transference of thermal energy from the heater to other areas of the flow sensor. A DC power supply supplies electric current to the heater module and the fluid temperature sensor. A Wheatstone bridge module is used to regulate electric current supplied to the heater, based on a constant temperature difference between the heater and the fluid, and to provide voltage information of the electric current. A microprocessor converts the voltage information into velocity values of the fluid inside the bypass channel. The bypass channel is so designed that flow impedance is decided by adjusting the cross section area of the channel.

In one embodiment of this invention, the fluid temperature sensor has the same design of the heater module. With two heater modules functioning as fluid temperature sensor and heater module, respectively, the factor of flow direction of the fluid may be ignored.

These and other objectives and advantages of this invention may be clearly understood from the detailed description by referring to the following drawings.

IN THE DRAWINGS

DETAILED DESCRIPTION OF THE INVENTION

Figure 3:
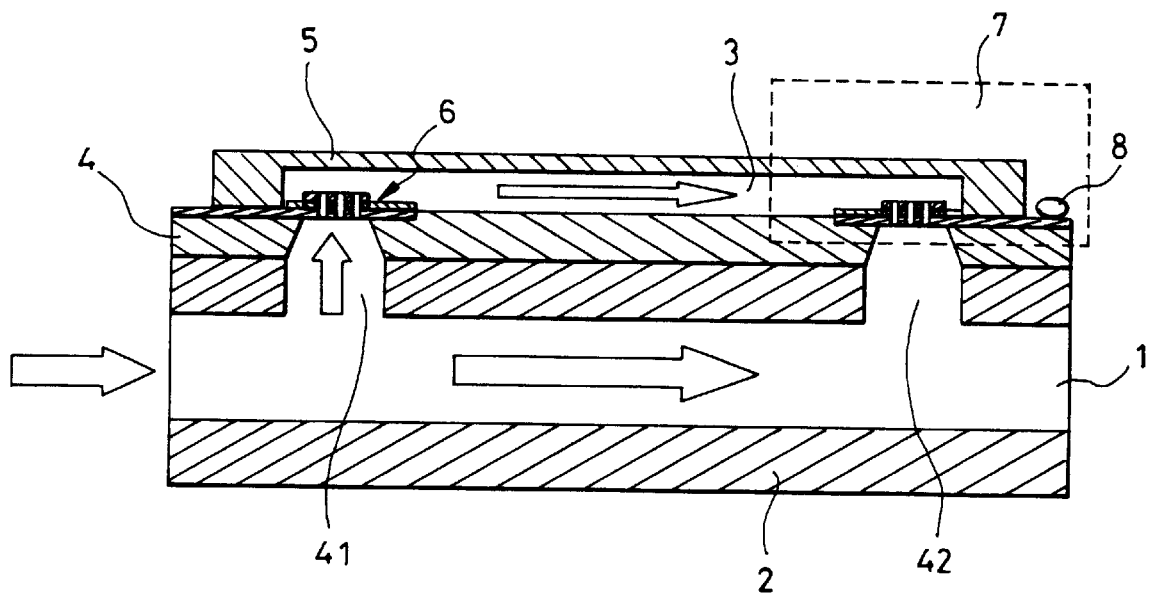
FIG. 3 illustrates the sectional view of an embodiment of the integrated flow sensor of this invention.

Referring to FIG. 3 which illustrates the sectional view of an embodiment of the integrated flow sensor of this invention. As shown in the figure, a fluid channel is surrounded by a stainless steel housing 2. A bypass channel 3 is positioned on said stainless steel housing 2 and is connected with the fluid channel 1 with fluid entrance 41 and fluid exit 42. Inside the bypass channel 3 are: a fluid temperature sensor 6, and a heater module 7. The bypass channel 3 is formed on a silicon substrate 4 and covered by a glass sealing 5. Other materials suited to form the bypass channel may also be adopted. Generally the cross sectional area of the fluid channel 1 and that of the bypass may be at a 600:1 ratio, while other ratios may also be applicable. The bypass functions to reduce the total flow impedance. Arrows show the direction of the fluid flow.

Fluid temperature sensor 6 is positioned at the entrance 41 of the bypass channel 3 to measure the temperature of the fluid. The temperature sensor 6 may be any suited conventional temperature sensor. In one embodiment of this invention, the sensor 6 is made of platinum. The sensor 6 is preferably covered by a protection layer and is most preferably supported by a micro bridge positioned over the entrance 41. The material of the protection layer and the micro bridge may be same or different. In one embodiment of this invention, the protection layer is made of $SiO_2$ and the micro bridge is made of SiNx. The fluid temperature sensor 6 may further be adhered to the micro bridge with a $Cr_2O_3$ adhesive. In the embodiments of this invention, the sensor 6 is positioned normally to the flow direction of the fluid.

Heater module 7 is positioned at the exit 42 of the bypass channel 3, thus the thermal energy contained in is may be transferred to the fluid. A constant temperature difference between the heater module 7 and the fluid is set. 8 is an electric pad connected to a power supplier (not shown).

Figure 4:
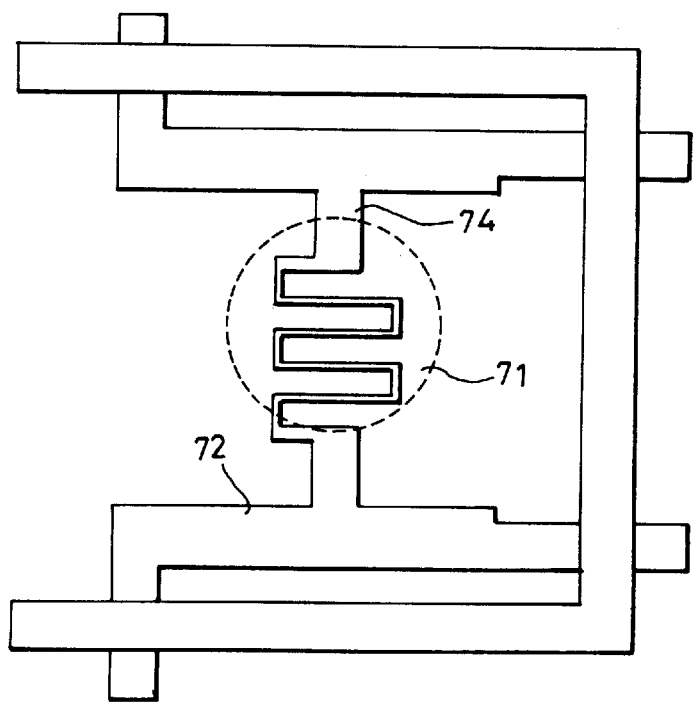
FIG. 4 illustrates the structure of a heater module suited in the integrated flow sensor of this invention.
Figure 5:
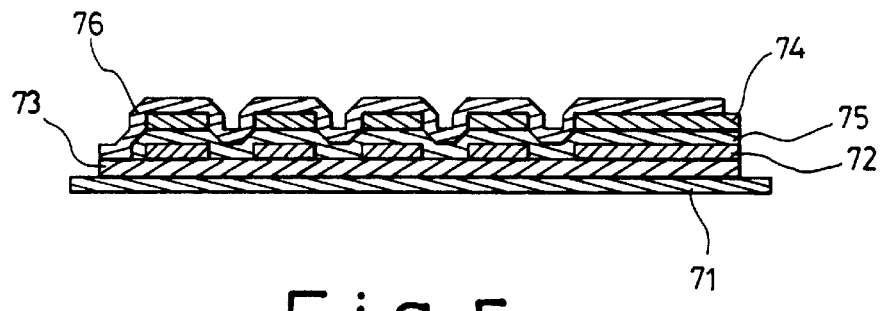
FIG. 5 illustrates its sectional view along line A—A.

FIG. 4 illustrates the structure of a heater module used in the integrated flow sensor of this invention. FIG. 5 is its sectional view along line A—A. As shown in the figures, the heater module 7 comprises: a floating membrane 71, a heater 72 and a heater temperature sensors 74. The floating membrane 71 functions as a micro bridge over the exit 42 of the flow. As shown in FIG. 4, the micro bridge 71 is positioned normally to the fluid flow. Such arrangement may increase the heat transfer efficiency for up to 20%. In one embodiment of this invention, the float membrane 71 is made of SiNx, while other material that may form a floating member and is suited for semiconductor manufacturing process may be applicable.

Heater 72 and heater temperature sensor 74 are closely overlapped with an insulation layer 75 between them. Heater 72 is adhered to the floating membrane 71 with an adhesion layer 73. A protection layer 76 is disposed on top of the heater temperature sensor 74.

Heater 72 may be made of platinum or other suited ohmic material, and so is the heater temperature sensor 74. The heater 72 is adhered to the floating membrane 71 with a $Cr_2O_3$ adhesive layer 73. Such adhesive layer may be made of any other suited material. Material for the insulation layer 75 and the protection layer 76 may be the same or difference. In one embodiment of this invention, these layers 75 and 76 are made of SiNx. As shown in FIG. 4, heater 72 has a meander pattern to create better thermal contact between the heater 72 and fluid. Other shapes or patterns may be applicable to the heater 72. Also shown in this figure, heater temperature sensor 74 has the same pattern of heater 72. In some other embodiments, the sensor 74 has a different pattern. The shape of the micro bridge 71 may be the same as that of the heater 72, or may be a strip.

In another embodiment of this invention, fluid temperature sensor 6 has the same design of heater module 7. These two heater modules 6 and 7 may function as one fluid temperature sensor and one heater module respectively, decided by a switch (not shown). In this embodiment, flow direction of the fluid may be ignored while the flow sensor is installed to the fluid channel 1.

Figure 1:
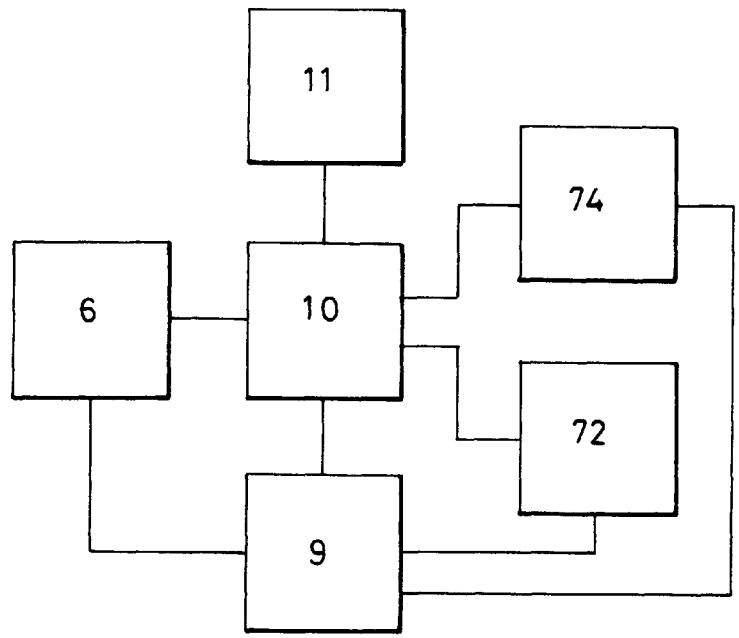
FIG. 1 illustrates the system diagram of a conventional thermal flow sensor.
Figure 2:
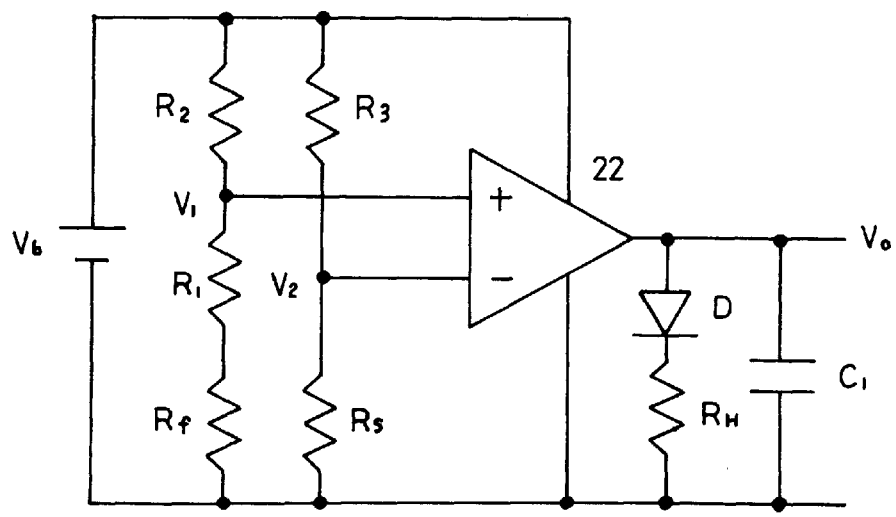
FIG. 2 illustrates the circuit diagram of a Wheatstone bridge module of a thermal flow sensor.

The measurement of the fluid velocity under this invention may be accomplished with a Wheatstone bridge module, which has a similar design of that shown in FIG. 2. As shown in this figure, the Wheatstone bridge module 10 comprises a Wheatstone bridge 12 biased at $V_0$ and an operation amplifier 22 with a cascade power amplifier. In a steady state of balance, the output voltage $V_0$ shows the amount of electrical current supplied to the heater 71 or $R_H$ and designates the flow velocity. This circuit provides the function of compensating the fluid temperature by differentiating resistor $R_5$ and $R_f$. Resistor $R_1$ serves to set a constant temperature difference between $R_5$ and $R_f$ under the condition that $R_f+R_1+R_2=R_3+R_5$. A diode (D) and a capacitor $C_1$ are used to protect the heater from being overheated. In practical measurements, the system first comes to thermal balance at zero flow. As flow speeds up, temperature of the heater 71 drops and, thus, $V_2$ drops as a result of a decrease in $R_5$, forcing the power amplifier to pump more $$V_0 = G(V_1 + V_2) = GV_b\left(\frac{R_f + R_1}{R_f + R_1 + R_2} - \frac{R_s}{R_s + R_3}\right)$$

current into $R_H$ to regain thermal balance. By measuring the $R_5$, the fluid velocity may be measured.

Let $R_f+R_1+R_2=R_3+R_5$. We then have:
Wherein G is gain of the operational amplifier 12. Thus:
And $V_0$ is in direct ratio to $\sqrt{U}$, wherein U is fluid velocity.

$$V_0 = GV_b\left(\frac{R_1}{R_S + R_3}\right)$$

Figure 6:
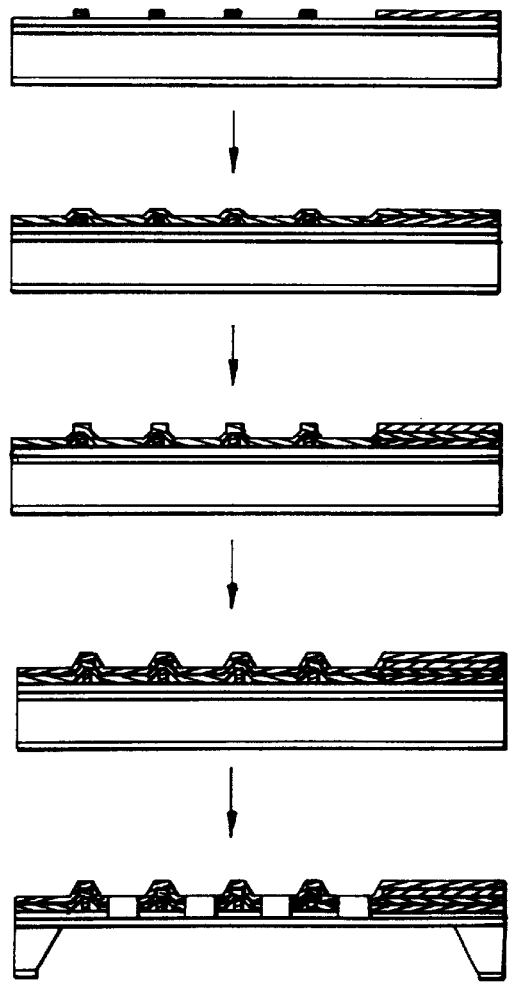
FIG. 6 illustrates the processes of the preparation of the heater module for the integrated flow sensor of this invention.

The following is a description of the process in preparing the integrated flow sensor of this invention. In preparing the integrated flow sensor, the heater module 7 is first prepared. FIG. 6 illustrates the processes of the preparation of the heater module of this invention. As shown in this figure, at the first step, 1500 angstroms of silicon nitride is deposited on both sides of a silicon wafer as material to support the sensing unit. Then 500 angstroms of $Cr_2O_3$ is sputtered as an adhesive layer. Later, 1100 angstroms of platinum meander pattern is deposited as heater. On the heater, 500 angstroms of silicon oxide isolation layer is deposited. Later, 1100 angstroms of platinum pattern is deposited as temperature sensors and then 1500 angstroms of silicon nitride protection layer. The total length of the meander heater is designed at 2000 um to generate a net resistance of 600 ohms and the surface area of the heater module is preferably approximately 200 um square.

After these steps, hole metalization and electrical pads are processed and the front side of the chip is etched to form deep wells and the rear side is etched through to form micro channel and its entrance and exit, whereby a microbridge is prepared. The heater module is thus prepared.

After the heater module is prepared, a grooved channel is fabricated on a glass wafer and the glass wafer is bonded to the silicon wafer. Thus a bypass channel is prepared. The bypass channel is then mounted to the metal housing of a fluid channel, connecting the entrance and exit with the fluid channel in said metal housing.

EFFECTS OF THE INVENTION

As described in the above, the present invention provides an integrated thermal flow sensor with a bypass channel, a fluid temperature sensor and a heater module, together integrated in one single semiconductor chip. In the integrated flow sensor of this invention, the heater and heater temperature sensor are overlapped close to each other. Precise measurement of heater temperature is obtained. In this invention the heater is mounted over the fluid channel and supported by a micro bridge. Unwanted thermal resistance due to thermal boundary layer generated between the heater and the fluid may be reduced. The invented flow sensor has compact size and may be prepared with semiconductor manufacture process, whereby lower cost and higher productivity of the flow sensor may be achieved.

While the fluid temperature sensor and the heater module have the same design, the direction of the fluid flow may be ignored during the installation of the thermal flow sensor.

The integrated flow sensor of this invention may be further integrated with micro sensor actuators, such as microvalve, micropumper and other micro components.

As the present invention has been shown and described with reference to preferred embodiments thereof, those skilled in the art will recognize that the above and other changes may be made therein without departing from the spirit and scope of the invention.

What is claimed is:

1. An integrated thermal flow sensor, comprising:
   a channel for a fluid to be measured to flow through;
   a fluid temperature sensor to measure a temperature of said fluid;
   a heater to generate thermal energy, positioned inside said channel and connectable to said fluid;
   a heater temperature sensor adjacent to said heater to measure a temperature of said heater;
   a power supplier to supply electric current to said fluid temperature sensor, said heater, and said heater temperature sensor;
   a regulator to regulate current supplied to said heater such that a substantial difference is maintained between the temperature of said heater and the temperature of said fluid, and to generate signals representing variations of current supplied to said heater;
   a calculator to calculate velocity of said fluid according to the current variation signals generated by said regulator;
   an insulation layer to electrically isolate said heater and said heater temperature sensor; and
   a floating element positioned substantially normally to said channel to support said heater and said heater temperature sensor.

2. The integrated flow sensor according to claim 1 wherein said regulator comprises a Wheatstone bridge.

3. The integrated flow sensor according to claim 1 wherein said heater is a platinum foil.

4. The integrated flow sensor according to claim 1 wherein said heater temperature sensor is a platinum foil.

5. The integrated flow sensor according to claim 1 wherein said insulation layer is a silicon dioxide layer.

6. The integrated flow sensor according to claim 1 wherein said floating element is a silicon nitride membrane.

7. The integrated flow sensor according to claim 1 wherein said heater is adhered to said floating element with a metal oxide adhesive.

8. The integrated flow sensor according to claim 1 wherein said heater is adhered to said floating element with a $Cr_2O_3$ layer.

9. The integrated flow sensor according to any one of claims 1 to 8 wherein said channel is formed on a silicon substrate with its entrance and exit opening through said substrate and is covered by a glass housing, wherein said floating element, said heater and said heater temperature are mounted over at least one of said entrance and said exit.

* * * * *